(12) United States Patent
Chen

(10) Patent No.: US 12,160,009 B2
(45) Date of Patent: Dec. 3, 2024

(54) BATTERY CELL, METHOD AND SYSTEM FOR MANUFACTURING SAME, BATTERY, AND ELECTRICAL DEVICE

(71) Applicant: CONTEMPORARY AMPEREX TECHNOLOGY (HONG KONG) LIMITED, Hong Kong (CN)

(72) Inventor: Wenwei Chen, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 266 days.

(21) Appl. No.: 17/948,688

(22) Filed: Sep. 20, 2022

(65) Prior Publication Data

US 2023/0021075 A1    Jan. 19, 2023

Related U.S. Application Data

(63) Continuation of application No. PCT/CN2020/137356, filed on Dec. 17, 2020.

(51) Int. Cl.
*H01M 50/166* (2021.01)
*H01M 10/0585* (2010.01)
(Continued)

(52) U.S. Cl.
CPC ..... *H01M 50/166* (2021.01); *H01M 10/0585* (2013.01); *H01M 50/102* (2021.01); *H01M 50/204* (2021.01); *H01M 2220/20* (2013.01)

(58) Field of Classification Search
CPC ............. H01M 50/166; H01M 50/102; H01M 50/204; H01M 10/0585; H01M 2220/20
See application file for complete search history.

(56) References Cited

U.S. PATENT DOCUMENTS

2010/0209750 A1* 8/2010 Nagamatsu .......... H01M 50/119
429/94
2012/0301759 A1* 11/2012 Yoshitake ............ H01M 50/119
429/94
(Continued)

FOREIGN PATENT DOCUMENTS

CN    101765931 A    6/2010
CN    102035017 A    4/2011
(Continued)

OTHER PUBLICATIONS

China National Intellectual Property Administration (CNIPA) Office Action 1 for Application No. 202080102020.3 Jun. 18, 2024 9 Pages (including translation).
(Continued)

*Primary Examiner* — Christopher P Domone
*Assistant Examiner* — Jonathan William Estes
(74) *Attorney, Agent, or Firm* — ANOVA LAW GROUP, PLLC

(57) ABSTRACT

A battery cell includes an electrode assembly, a housing, a cover plate, and a support member. The housing includes a first electrode plate and a second electrode plate. At least a part of the first electrode plate is stacked with the second electrode plate. The housing is provided with an opening and an accommodation cavity configured to accommodate the electrode assembly. The housing includes a side plate. The cover plate is perpendicular to the side plate and configured to close the opening. At least a part of the support member is disposed between the side plate and the electrode assembly, and the support member is configured to support the electrode assembly so that a spacing between an end, facing the side plate, of the first electrode plate and the side plate in a first direction is greater than a preset value. The first direction being a direction perpendicular to the side plate.

19 Claims, 10 Drawing Sheets

(51) Int. Cl.
H01M 50/102 (2021.01)
H01M 50/204 (2021.01)

(56) References Cited

U.S. PATENT DOCUMENTS

| | | |
|---|---|---|
| 2012/0321922 A1 | 12/2012 | Kim et al. |
| 2013/0302667 A1 | 11/2013 | Kim et al. |
| 2014/0295232 A1 | 10/2014 | Kim et al. |
| 2015/0364741 A1* | 12/2015 | Kwon .................. H01M 50/54 429/208 |
| 2016/0293995 A1 | 10/2016 | Pasma et al. |

FOREIGN PATENT DOCUMENTS

| | | |
|---|---|---|
| CN | 102800824 A | 11/2012 |
| CN | 203103376 U | 7/2013 |
| CN | 204927359 U | 12/2015 |
| CN | 110165113 A | 8/2019 |
| JP | 2009048966 A | 3/2009 |
| JP | 2011082162 A | 4/2011 |
| JP | 2013168283 A | 8/2013 |
| WO | 2020177599 A1 | 9/2020 |

OTHER PUBLICATIONS

Japan Patent Office (JPO) Decision to Grant a Patent For JP Application No. 2022-563181 Apr. 23, 2024 4 Pages (including translation).
Japan Patent Office (JPO) Notice of Reasons for Refusal For JP Application No. 2022-563181 Nov. 7, 2023 7 Pages (including translation).
The World Intellectual Property Organization (WIPO) International Search Report for PCT/CN2020/137356 May 26, 2021 8 pages (including translation).
The Japan Patent Office (JPO) Notice of Reasons for Refusal for Application No. 2022-563181 Nov. 7, 2023 7 Pages(including translation).
The European Patent Office (EPO) The Extended Search Report for EP Application No. 20965563.85 Sep. 6, 2023 9 Pages.

* cited by examiner

BATTERY CELL, METHOD AND SYSTEM FOR MANUFACTURING SAME, BATTERY, AND ELECTRICAL DEVICE

CROSS-REFERENCE TO RELATED APPLICATION

This application is a continuation of International Application No. PCT/CN2020/137356, filed Dec. 17, 2020, the entire content of which is incorporated herein by reference.

TECHNICAL FIELD

This application relates to the technical field of batteries, and more specifically, to a battery cell, a method and system for manufacturing same, a battery, and an electrical device.

BACKGROUND

A rechargeable battery, also known as a secondary battery, is a battery that is reusable after the active material is activated by charging the battery that is discharged. Rechargeable batteries are widely used in electronic devices such as a mobile phone, a notebook computer, an electric power cart, an electric vehicle, an electric airplane, an electric ship, an electric toy car, an electric toy ship, an electric toy airplane, and a power tool.

The rechargeable batteries may include a nickel-cadmium battery, a nickel-hydrogen battery, a lithium-ion battery, a secondary alkaline zinc-manganese battery, and the like.

Currently, lithium-ion batteries are typically used in vehicles. As a rechargeable battery, the lithium-ion battery possesses advantages such as a small size, a high energy density, a high power density, reusability for many cycles, and a long shelf life.

A rechargeable battery includes an electrode assembly and an electrolytic solution. The electrode assembly includes a positive electrode plate, a negative electrode plate, and a separator located between the positive electrode plate and the negative electrode plate. The positive electrode plate is also referred to as a cathode electrode plate. Both surfaces of the positive electrode plate are coated with a positive active material layer. For example, a positive active material in the positive active material layer may be lithium manganese oxide, lithium cobalt oxide, lithium iron phosphate, or lithium nickel cobalt manganese oxide. The negative electrode plate is also referred to as an anode electrode plate. Both surfaces of the negative electrode plate are coated with a negative active material layer. For example, a negative active material in the negative active material layer may be graphite or silicon.

Lithium plating is a commonly seen abnormal phenomenon of lithium batteries, and adversely affects charging efficiency and an energy density of lithium ions. In a case of severe lithium plating, lithium dendrites may be formed. The lithium dendrites may pierce the separator, resulting in thermal runaway of internal short circuits and bringing severe hazards to battery safety.

Therefore, how to reduce or avoid lithium plating and improve battery safety has become a tricky problem in the industry.

SUMMARY

This application provides a battery cell, a method and system for manufacturing same, a battery, and an electrical device to reduce risks of lithium plating and enhance battery safety.

According to a first aspect, an embodiment of this application provides a battery cell. The battery cell includes: an electrode assembly, including at least one first electrode plate and at least one second electrode plate, where at least a part of the first electrode plate is stacked together with the second electrode plate; a housing, provided with an opening and an accommodation cavity configured to accommodate the electrode assembly, where the housing includes a first side plate; a cover plate, configured to close the opening, and perpendicular to the first side plate; and a support member. At least a part of the support member is disposed between the first side plate and the electrode assembly. The support member is configured to support the electrode assembly so that a spacing between an end of the first electrode plate and the first side plate in a first direction is greater than a preset value, the end facing the first side plate, and the first direction being a direction perpendicular to the first side plate.

In the battery cell according to this embodiment of this application, the support member can support the electrode assembly, reduce a shaking amplitude of the electrode assembly when the battery cell vibrates, reduce an acting force exerted by the first side plate on the electrode assembly, and reduce risks of tearing tabs. In addition, with the support member disposed, the spacing between the end of the first electrode plate and the first side plate in the first direction is greater than a preset value, the end facing the first side plate. This reduces the acting force conveyed to the end of the first electrode plate, reduces risks of detachment of an active material of the first electrode plate, and suppresses lithium plating.

In some embodiments, the housing further includes a second side plate perpendicular to the first side plate and the cover plate. A transition plate exists between the first side plate and the second side plate. An inner surface of the transition plate is an arc face; and the preset value is defined as H, a radius of the inner surface of the transition plate is defined as R, and the preset value H and the radius R satisfy: H≥0.8R. In this case, this application can reduce an area of a region that is of the transition plate and that is prone to squeeze the first electrode plate, and can reduce the acting force exerted by the transition plate on the first electrode plate, and reduce risks of fall-off of the active material.

In some embodiments, the preset value H and the radius R satisfy: R≤H≤2R.

In some embodiments, the value of the radio R is 0.5 mm to 2 mm.

In some embodiments, an area of the second side plate is larger than an area of the first side plate. When the electrode assembly squeezes the second side plate, the force-bearing area of the electrode assembly is relatively large, and a reacting force received is relatively even. Therefore, the active material of the electrode plate is not prone to fall off when an acting force is received from the second side plate.

In some embodiments, the battery cell further includes a first insulating member disposed at a side that is of the cover plate and that faces the electrode assembly. The first insulating member is configured to isolate the cover plate from the electrode assembly. The support member is spaced apart from the first insulating member along a second direction, the second direction being a direction perpendicular to the cover plate. This can prevent the first insulating member from interfering with the support member.

In some embodiments, the housing further includes a bottom plate disposed at a side that is of the electrode assembly and that faces away from the cover plate. The bottom plate is perpendicular to the first side plate. The support member is spaced apart from the bottom plate along a second direction, the second direction being a direction perpendicular to the cover plate. This can prevent the bottom plate from interfering with the support member.

In some embodiments, the first side plate is two in number. The two first side plates are located at two sides of the electrode assembly along the first direction respectively. The support member is disposed between the electrode assembly and each of the first side plates. Each support member can reduce the acting force exerted by the corresponding first side plate on the electrode assembly when the battery cell vibrates, and reduce risks of fall-off of the active material.

In some embodiments, the electrode assembly includes a first surface facing the first side plate. The support member is located between the first surface and the first side plate.

In some embodiments, two edges of the first surface along a second direction exceed two edges of the support member along the second direction respectively. Two edges of the first surface along a third direction exceed two edges of the support member along the third direction respectively. The second direction is a direction perpendicular to the cover plate, and the third direction is perpendicular to the first direction and the second direction.

In some embodiments, the battery cell further includes a second insulating member configured to isolate the electrode assembly from the housing. The second insulating member includes a first insulating portion. The first insulating portion is disposed between the first side plate and the first surface. The first insulating portion not only dielectrically isolates the first side plate from the electrode assembly, but also fits with the support member to support the electrode assembly.

In some embodiments, the second insulating member further includes a second insulating portion and two third insulating portions. The second insulating portion is located at a side that is of the electrode assembly and that faces away from the cover plate along a second direction, and is connected to the third insulating portions. The two third insulating portions are disposed at two sides of the electrode assembly along the third direction respectively. First insulating portions connected to the third insulating portions are disposed at two sides of the electrode assembly along the first direction. At least one first insulating portion is connected to the two third insulating portions.

In some embodiments, the second insulating portion is two in number. The two second insulating portions are connected to the two third insulating portions respectively, and the two second insulating portions at least partly overlap in the second direction. Two first insulating portions are disposed at a side of the electrode assembly along the first direction. The two first insulating portions are connected to the two third insulating portions respectively and at least partly overlap in the first direction.

In some embodiments, the support member is disposed between the first insulating portion and the first surface. In a process of placing the electrode assembly into the housing, the first insulating portion can protect the support member and guide the support member into the housing, thereby preventing the support member from being scratched by the housing.

In some embodiments, the battery cell further includes a bonding member. The bonding member is configured to connect the support member to the electrode assembly. The bonding member fixes the support member to the electrode assembly. In this way, when the battery cell vibrates, relative movement between the support member and the electrode assembly is reduced or avoided, and the risks of the support member deviating from the preset position in the housing are reduced.

In some embodiments, the electrode assembly includes a first surface facing the first side plate and a second surface connected to the first surface. The second surface is perpendicular to the first side plate and the cover plate. The bonding member includes a first bonding portion and a second bonding portion. The first bonding portion is bonded to a surface that is of the support member and that is away from the first surface. The second bonding portion is connected to the first bonding portion and bonded to the second surface. The bonding member can coat at least a part of a joint between the first surface and the second surface from outside, and space the joint apart from the transition plate, thereby reducing the acting force on the electrode plate and reducing risks of fall-off of the active material.

In some embodiments, the bonding member is plural in number, and the plurality of bonding members are discrete and spaced out along a second direction, the second direction being a direction perpendicular to the cover plate. The plurality of bonding members can increase strength of connection between the support member and the electrode assembly.

According to a second aspect, an embodiment of this application further provides a battery. The battery includes a box and at least one battery cell according to the first aspect. The battery cell is accommodated in the box.

In some embodiments, in the battery cell, the first side plate is located at a lower side of the electrode assembly along a vertical direction.

According to a third aspect, an embodiment of this application further provides an electrical device. The electrical device is configured to receive electrical energy provided by the battery according to the second aspect.

According to a fourth aspect, an embodiment of this application further provides a method for manufacturing a battery cell. The method includes: providing an electrode assembly, where the electrode assembly includes at least one first electrode plate and at least one second electrode plate, and at least a part of the first electrode plate is stacked together with the second electrode plate; providing an end cap assembly that includes a cover plate and electrode terminals disposed at the cover plate, and connecting the electrode assembly to the electrode terminals; providing a support member, and connecting the support member to the electrode assembly; providing a housing, where the housing is provided with an opening and an accommodation cavity configured to accommodate the electrode assembly, and the housing includes a first side plate; and placing the electrode assembly and the support member connected to the electrode assembly into the accommodation cavity, and then connecting the cover plate to the housing, so that the cover plate closes the opening and is perpendicular to the first side plate. At least a part of the support member is disposed between the first side plate and the electrode assembly. The support member is configured to support the electrode assembly so that a spacing between an end of the first electrode plate and the first side plate in a first direction is greater than a preset value, the end facing the first side plate, and the first direction being a direction perpendicular to the first side plate.

According to a fifth aspect, an embodiment of this application further provides a system for manufacturing a battery cell. The system includes: a first providing device, configured to provide an electrode assembly, where the electrode assembly includes at least one first electrode plate and at least one second electrode plate, and at least a part of the first electrode plate is stacked together with the second electrode plate; a second providing device, configured to provide an end cap assembly that includes a cover plate and electrode terminals disposed at the cover plate; a first assembling device, configured to connect the electrode assembly to the electrode terminals; a third providing device, configured to provide a support member; a second assembling device, configured to connect the support member to the electrode assembly; a fourth providing device, configured to provide a housing, where the housing is provided with an opening and an accommodation cavity configured to accommodate the electrode assembly, and the housing includes a first side plate; and a third assembling device, configured to place the electrode assembly and the support member connected to the electrode assembly into the accommodation cavity, and then connect the cover plate to the housing, so that the cover plate closes the opening and is perpendicular to the first side plate. At least a part of the support member is disposed between the first side plate and the electrode assembly. The support member is configured to support the electrode assembly so that a spacing between an end of the first electrode plate and the first side plate in a first direction is greater than a preset value, the end facing the first side plate, and the first direction being a direction perpendicular to the first side plate.

BRIEF DESCRIPTION OF DRAWINGS

To describe the technical solutions in the embodiments of this application more clearly, the following outlines the drawings used in the embodiments of this application. Evidently, the drawings outlined below are merely a part of embodiments of this application. A person of ordinary skill in the art may derive other drawings from the outlined drawings without making any creative efforts.

Figure 1:
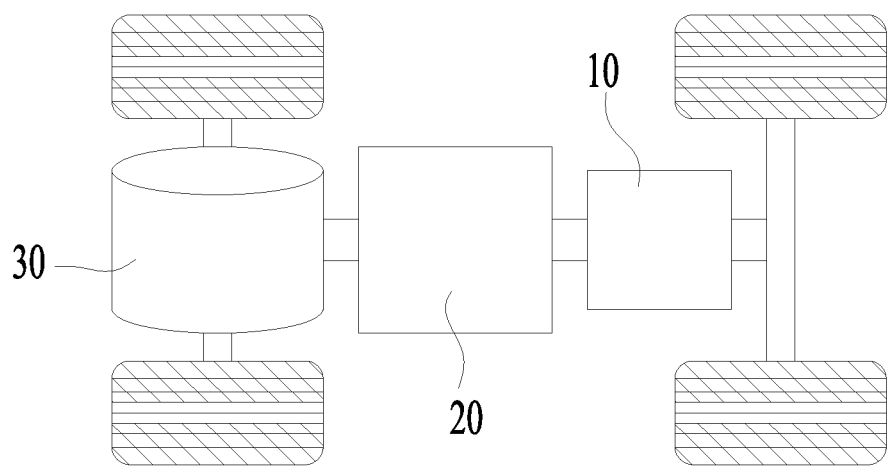
FIG. 1 is a schematic structural diagram of a vehicle according to an embodiment of this application.

The drawings are not drawn to scale.

DETAILED DESCRIPTION OF EMBODIMENTS

To make the objectives, technical solutions, and advantages of the embodiments of this application clearer, the following gives a clear description of the technical solutions in the embodiments of this application with reference to the drawings in the embodiments of this application. Evidently, the described embodiments are merely a part of but not all of the embodiments of this application. All other embodiments derived by a person of ordinary skill in the art based on the embodiments of this application without making any creative efforts fall within the protection scope of this application.

Unless otherwise defined, all technical and scientific terms used herein have the same meanings as usually understood by a person skilled in the technical field of this application. The terms used in the specification of this application are merely intended for describing specific embodiments but are not intended to limit this application. The terms "include" and "contain" and any variations thereof used in the specification, claims, and brief description of drawings of this application are intended as non-exclusive inclusion. The terms such as "first" and "second" used in the specification, claims, and brief description of drawings of this application are intended to distinguish different objects, but are not intended to describe a specific sequence or order of priority.

Reference to "embodiment" in this application means that a specific feature, structure or characteristic described with reference to the embodiment may be included in at least one embodiment of this application. Reference to this term in different places in the specification does not necessarily represent the same embodiment, nor does it represent an independent or alternative embodiment in a mutually exclusive relationship with other embodiments. A person skilled in the art explicitly and implicitly understands that the embodiments described in this application may be combined with other embodiments.

In the description of this application, unless otherwise expressly specified and defined, the terms "mount", "concatenate", "connect", and "attach" are understood in a broad sense. For example, a "connection" may be a fixed connection, a detachable connection, or an integrated connection; or may be a direct connection or an indirect connection implemented through an intermediary; or may be internal communication between two components. A person of ordinary skill in the art understands the specific meanings of the terms in this application according to the context.

The term "and/or" in this application indicates merely a relation for describing the related objects, and represents three possible relationships. For example, "A and/or B" may represent the following three circumstances: A alone, both A and B, and B alone. In addition, the character "I" herein generally indicates an "or" relationship between the object preceding the character and the object following the character.

"A plurality of" referred to in this application means two or more (including two). Similarly, "a plurality of groups" means two or more groups (including two groups), and "a plurality of pieces" means two or more pieces (including two pieces).

In this application, the term "parallel" includes not only a scenario of being absolutely parallel, but also a scenario of being approximately parallel according to conventional knowledge of engineering. Also, the term "perpendicular" includes not only a scenario of being absolutely perpendicular, but also a scenario of being approximately perpendicular according to conventional knowledge of engineering.

In this application, a battery cell may include a lithium-ion secondary battery, a lithium-ion primary battery, a lithium-sulfur battery, a sodium-lithium-ion battery, a sodium-ion battery, a magnesium-ion battery, or the like. The embodiments of this application do not limit the type of the battery cell. The battery cell may be in a cylindrical shape, a flat shape, a cuboidal shape, or other shapes. The embodiments of this application do not limit the shape of the battery cell.

The battery mentioned in the embodiments of this application means a stand-alone physical module that includes one or more battery cells to provide a higher voltage and a higher capacity. For example, the battery mentioned in this application may include a battery module, a battery pack, or the like. A battery typically includes a box configured to package one or more battery cells. The box can prevent liquid or other foreign matters from affecting the charging or discharge of the battery cells.

A battery cell includes an electrode assembly and an electrolytic solution. The electrode assembly includes a positive electrode plate, a negative electrode plate, and a separator. The battery cell works primarily by relying on movement of metal ions between the positive electrode plate and the negative electrode plate. The positive electrode plate includes a positive current collector and a positive active material layer. The positive active material layer is coated on a surface of the positive current collector. A part that is of the current collector and that is not coated with the positive active material layer protrudes from a part that is of the current collector and that is coated with the positive active material layer. The part that is of the current collector and that is not coated with the positive active material layer serves as a positive tab. Using a lithium-ion battery as an example, the positive current collector may be made of aluminum, and a positive active material may be lithium cobalt oxide, lithium iron phosphate, ternary lithium, lithium manganese oxide, or the like. The negative electrode plate includes a negative current collector and a negative active material layer. The negative active material layer is coated on a surface of the negative current collector. A part that is of the current collector and that is not coated with the negative active material layer protrudes from a part that is of the current collector and that is coated with the negative active material layer. The part that is of the current collector and that is not coated with the negative active material layer serves as a negative tab. The negative current collector may be made of copper, and a negative active material may be carbon, silicon, or the like. In order to ensure passage of a large current without fusing off, the positive tab is plural in number, and the plurality of positive tabs are stacked together; the negative tab is plural in number, and the plurality of negative tabs are stacked together. A separator includes a large number of micropores that run through the separator. The micropores ensure free passage of electrolyte ions, and are well permeable to lithium ions. The separator may be made of polypropylene (PP), polyethylene (PE), or another material. In addition, the electrode assembly may be a jelly-roll structure or a stacked structure, without being limited herein. The development of the battery technology needs to allow for a plurality of design factors, including performance parameters such as energy density, cycle life, discharge capacity, charge rate, and discharge rate, and also needs to consider the safety of the battery.

During charging of a lithium-ion battery, lithium ions are deintercalated from the positive electrode plate and intercalated into the negative electrode plate. However, some abnormal conditions may occur, for example, the space for lithium intercalation in the negative electrode is insufficient, the resistance to intercalation of the lithium ions into the negative electrode is excessive, or the lithium ions are prematurely deintercalated from the positive electrode, and the de-intercalated lithium ions are unable to be intercalated into the negative active material layer of the negative electrode plate in an equal amount. The lithium ions that are unable to be intercalated into the negative electrode plate have to gain electrons from the surface of the negative electrode, thereby forming silver-white metal lithium simple substance, which is a phenomenon of lithium plating. Lithium plating not only deteriorates the performance of a lithium-ion battery and greatly shortens a cycle life, but also limits a fast-charge capacity of the lithium-ion battery. In addition, when the lithium plating occurs in a lithium-ion battery, the precipitated lithium metal is very active, and can react with the electrolytic solution even at a relatively low temperature. Consequently, a starting temperature ($T_{onset}$) of self-heating of the battery is lowered, and the self-heating speed increases, thereby severely impairing safety of the battery. Further, when the lithium plating is severe, the deintercalated lithium ions may form lithium dendrites on the surface of the negative electrode. The lithium dendrites are prone to pierce the separator, resulting in risks of a short circuit between the positive electrode plate and the negative electrode plate that are adjacent to each other.

During the research and development, the inventor finds that when an electrode assembly is vibrated or squeezed, an active material of a positive electrode plate or an active material of a negative electrode plate is prone to fall off, which is known as detachment of coating. Due to the fall-off of the active material, especially the fall-off of the active material from the negative electrode plate, lithium intercalation sites in a negative active material layer of the negative electrode plate may be less than the number of lithium ions available from the positive active material layer of the positive electrode plate adjacent to the negative electrode plate. Therefore, lithium plating is prone to occur during charging of a lithium battery.

In view of this, an embodiment of this application provides a technical solution. According to this technical solution, a support member is disposed in a battery cell to suppress the fall-off of the active material, reduce risks of lithium plating, and improve battery safety.

All technical solutions described in the embodiments of this application are applicable to various battery-powered devices such as a mobile phone, a portable device, a laptop computer, an electric power cart, an electrical toy, a power tool, an electric vehicle, a ship, and a spacecraft. The spacecraft includes, for example, an airplane, a rocket, a space shuttle, and a spaceship.

Understandably, the technical solutions described in the embodiments of this application are not only applicable to the devices described above, but also applicable to all battery-powered devices. However, for brevity, the following embodiments are described by using an electric vehicle as an example.

For example, as shown in FIG. 1, which is a schematic structural diagram of a vehicle 1 according to an embodiment of this application, the vehicle 1 may be an oil-fueled vehicle, a natural gas vehicle, or a new energy vehicle. The new energy vehicle may be a battery electric vehicle, a hybrid electric vehicle, a range-extended electric vehicle, or the like. A battery 10, a controller 20, and a motor 30 may be disposed inside the vehicle 1. The controller 20 is configured to control the battery 10 to supply power to the motor 30. For example, the battery 10 may be disposed at the bottom, front, or rear of the vehicle 1. The battery 10 may be configured to supply power to the vehicle 1. For example, the battery 10 may serve as an operating power supply of the vehicle 1 to power a circuit system of the vehicle 1. For example, the battery may be configured to meet operating power usage requirements of the vehicle 1 that is being started or navigated or running. In another embodiment of this application, the battery 10 serves not only as an operating power supply of the vehicle 1, but may also serve as a drive power supply of the vehicle 1 to provide driving power for the vehicle 1 in place of or partially in place of oil or natural gas.

To meet different power usage requirements, the battery 10 may include a plurality of battery cells. The plurality of battery cells may be connected in series, parallel, or series-and-parallel pattern. The series-and-parallel pattern means a combination of series connection and parallel connection. The battery 10 may also be referred to as a battery pack. Optionally, the plurality of battery cells may be connected in series, parallel, or series-and-parallel pattern to form a battery module, and then a plurality of battery modules may be connected in series, parallel, or series-and-parallel pattern to form the battery 10. In other words, the plurality of battery cells may directly form the battery 10, or form the battery modules that are then used to form the battery 10.

Figure 2:
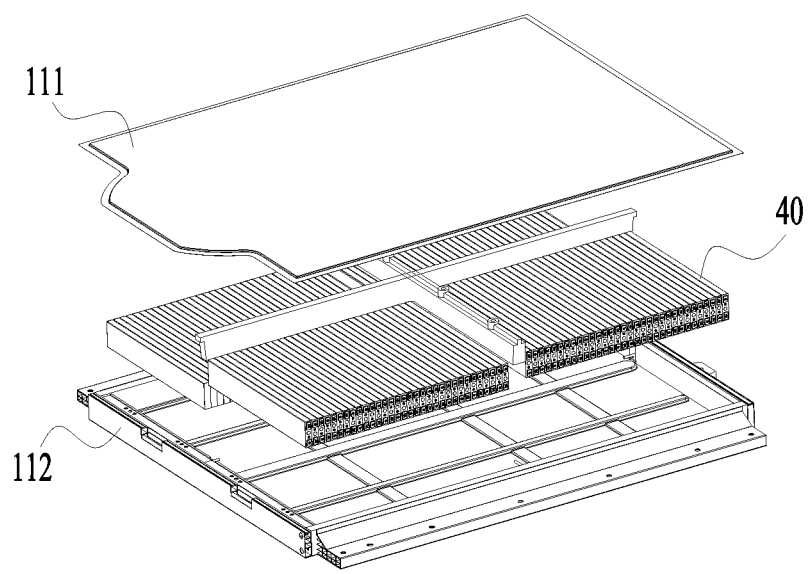
FIG. 2 is a schematic structural diagram of a battery according to an embodiment of this application.

For example, as shown in FIG. 2, which is a schematic structural diagram of a battery 10 according to an embodiment of this application, the battery 10 may include a plurality of battery cells 40. The battery 10 may further include a box (or referred to as a container). The interior of the box is a hollow structure. A plurality of battery cells 40 are accommodated in the box. As shown in FIG. 2, the box may include two parts, herein referred to as a first part 111 and a second part 112 respectively. The first part 111 and the second part 112 are snap-fitted together. The shapes of the first part 111 and the second part 112 may be determined depending on the shape of a combination of the plurality of battery cells 40. The first part 111 and the second part 112 each may be provided with an opening. For example, both the first part 111 and the second part 112 are a hollow cuboid, and each includes only one surface that is opened. The opening of the first part 111 is disposed opposite to the opening of the second part 112. The first part 111 is snap-fitted to the second part 112 to form a box with a closed chamber. The plurality of battery cells 40 are combined and connected in parallel, series, or series-and-parallel pattern, and then placed into the box that is formed by snap-fitting the first part 111 and the second part 112.

Optionally, the battery 10 may further include other structures, details of which are omitted here. For example, the battery 10 may further include a busbar component. The busbar component is configured to implement electrical connection between the plurality of battery cells 40, such as parallel connection, series connection, or series-parallel connection. Specifically, the busbar component may implement the electrical connection between the battery cells 40 by connecting electrode terminals of the battery cells 40. Further, the busbar component may be fixed to the electrode terminals of the battery cells 40 by welding. Electrical energy of the plurality of battery cells 40 may be further led out by a conductive mechanism running through the box. Optionally, the conductive mechanism may also belong to the busbar component.

Figure 3:
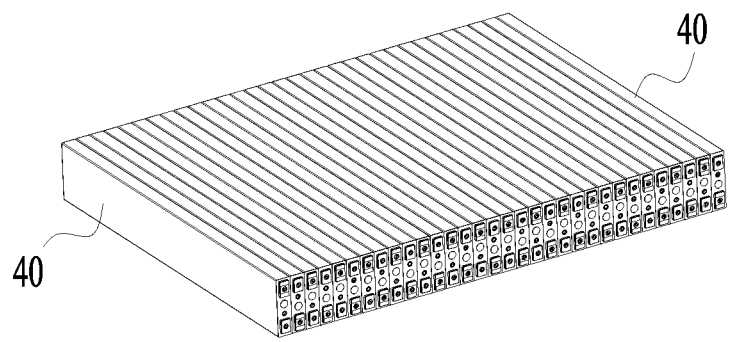
FIG. 3 is a schematic structural diagram of a battery module according to an embodiment of this application.

Depending on different power requirements, the number of battery cells 40 may be set to any value. A plurality of battery cells 40 may be connected in series, parallel, or series-and-parallel pattern to achieve a relatively high capacity or power. Each battery 10 may include a relatively large number of battery cells 40. Therefore, in order to facilitate mounting, the battery cells 40 may be arranged in groups. Each group of battery cells 40 forms a battery module. The number of battery cells 40 included in the battery module is not limited, and may be set as required. For example, FIG. 3 shows an example of a battery module. The battery 10 may include a plurality of battery modules. The battery modules may be connected in series, parallel, or series-and-parallel pattern.

Figure 4:
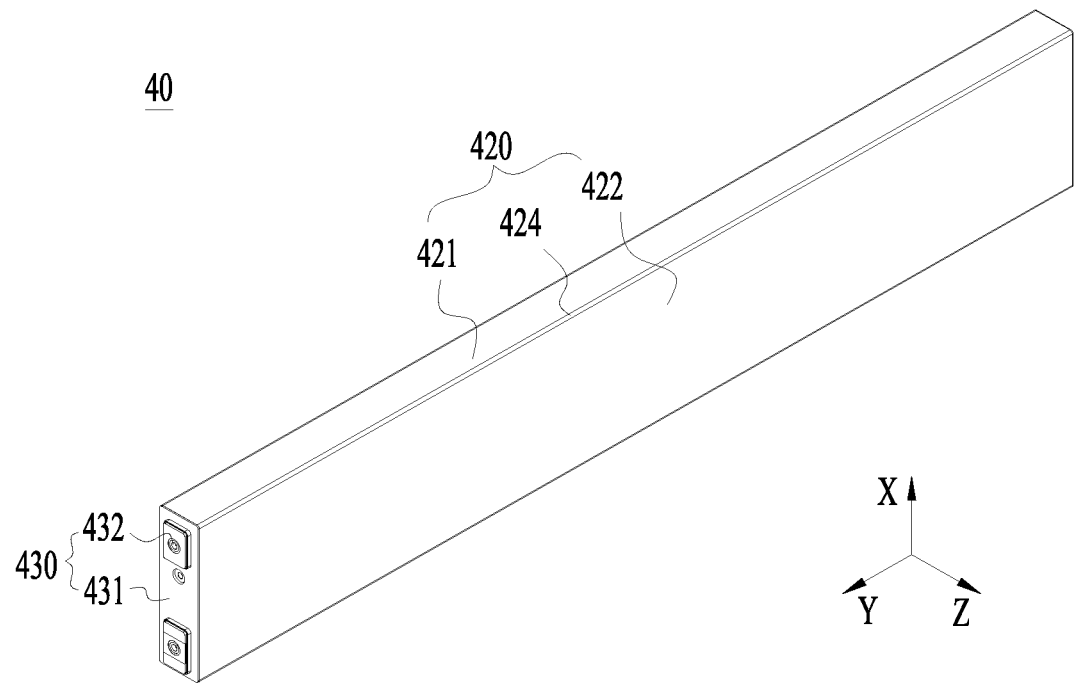
FIG. 4 is a schematic structural diagram of a battery cell according to an embodiment of this application.
Figure 5:
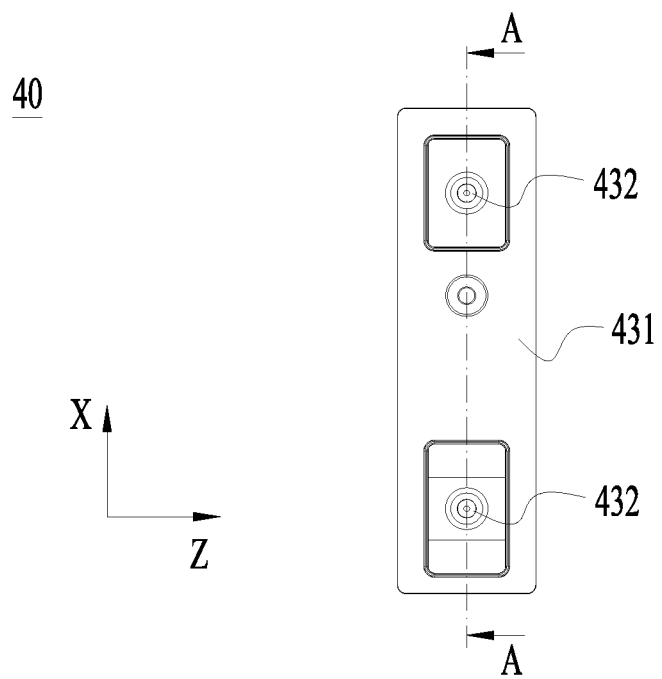
FIG. 5 is a schematic side view of the battery cell shown in FIG. 4.

FIG. 4 is a schematic structural diagram of a battery cell 40 according to an embodiment of this application; FIG. 5 is a schematic side view of the battery cell 40 shown in FIG. 4; and FIG. 6 is schematic sectional view of the battery cell 40 shown in FIG. 5 and sectioned along an A-A line.

Figure 6:
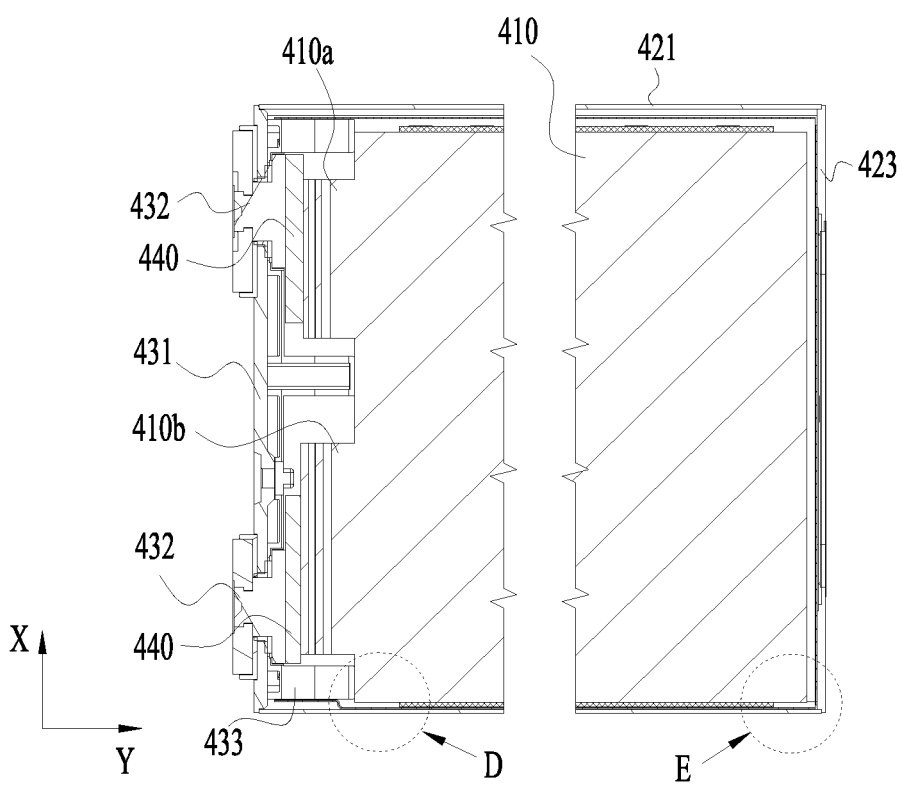
FIG. 6 is schematic sectional view of the battery cell shown in FIG. 5 and sectioned along an A-A line.

As shown in FIG. 4 to FIG. 6, the battery cell 40 according to this embodiment of this application includes an electrode assembly 410, a housing 420, and an end cap assembly 430. The housing 420 is provided with an accommodation cavity and an opening. The electrode assembly 410 is accommodated in the accommodation cavity. In some examples, when the housing 420 is a hollow cuboid or cube, one of faces of the housing 420 is an opened face. The opened face is not walled so that the inside of the housing 420 communicates with the outside. The end cap assembly 430 includes a cover plate 431. The cover plate 431 covers the opening and is connected to the housing 420, so as to close the opening of the housing 420 and place the electrode assembly 410 in the closed cavity. The housing 420 is filled with an electrolyte such as an electrolytic solution.

The end cap assembly 430 may further include two electrode terminals 432. The two electrode terminals 432 may be disposed at the cover plate 431. The cover plate 431 is generally in the shape of a flat plate. Two electrode terminals 432 are fixed on a flat surface of the cover plate 431. The two electrode terminals 432 are a positive electrode terminal and a negative electrode terminal 432 respectively. A connecting member 440, also referred to as a current collecting member, is disposed corresponding to each electrode terminal 432, located between the cover plate 431 and the electrode assembly 410, and configured to electrically connect the electrode assembly 410 and the electrode terminal 432.

Each electrode assembly 410 includes a first tab 410a and a second tab 410b. The polarity of the first tab 410a is opposite to the polarity of the second tab 410b. For example, when the first tab 410a is a positive tab, the second tab 410b is a negative tab. The first tabs 410a of one or more electrode assemblies 410 are connected to one electrode terminal 432 by one connecting member 440. The second tabs 410*b* of one or more electrode assemblies 410 are connected to another electrode terminal 432 by another connecting member 440. For example, the positive electrode terminal is connected to the positive tab by one connecting member 440, and the negative electrode terminal is connected to the negative tab by another connecting member 440.

In the battery cell 40, one or more electrode assembly 410 may be disposed according to actual use requirements. For example, in the illustrated embodiment, one electrode assembly 410 is disposed in the battery cell 40.

In some embodiments, the end cap assembly 430 may further include a first insulating member 433. The first insulating member 433 is disposed at a side that is of the cover plate 431 and that faces the electrode assembly 410. The first insulating member 433 can separate the cover plate 431 from the connecting member 440, and separate the cover plate 431 from the electrode assembly 410, to reduce short-circuit risks. The first insulating member 433 may be made of plastic. For example, the first insulating member 433 is made of polypropylene.

In some embodiments, the housing 420 is approximately a hollow cuboid. Specifically, the housing 420 includes two first side plates 421 opposite to each other and two second side plates 422 opposite to each other. Each first side plate 421 is connected to a second side plate 422, and is configured to define the accommodation cavity and the opening. The first side plate 421 and the second side plate 422 are in the shape of a flat plate and are perpendicular to each other. The two first side plates 421 are disposed parallel to each other, and the two second side plates 422 are disposed parallel to each other.

The cover plate 431 is connected to the first side plate 421 and the second side plate 422 to close the opening of the housing 420. For example, the cover plate 431 may be welded to the first side plate 421 and the second side plate 422. In the battery cell 40, the cover plate 431 is perpendicular to the first side plate 421 and the second side plate 422.

The two first side plates 421 are located at two sides of the electrode assembly 410 along the first direction X respectively, and the first direction X is a direction perpendicular to the first side plate 421. The first direction X is parallel to a thickness direction of the first side plate 421. Optionally, the first side plate 421 is approximately a rectangular flat plate. The cover plate 431 is located at a side of the electrode assembly 410 along a second direction Y, and the second direction Y is a direction perpendicular to the cover plate 431. The second direction Y is parallel to a thickness direction of the cover plate 431. Optionally, the cover plate 431 is approximately a rectangular plate. The two second side plates 422 are located at two sides of the electrode assembly 410 along a third direction Z respectively, and the third direction Z is a direction perpendicular to the second side plate 422. The third direction Z is parallel to a thickness direction of the second side plate 422. Optionally, the second side plate 422 is approximately a rectangular flat plate. In some examples, the thickness of the first side plate 421 is equal to the thickness of the second side plate 422.

In some embodiments, the housing 420 further includes a bottom plate 423 disposed at a side that is of the electrode assembly 410 and that faces away from the cover plate 431. That is, the bottom plate 423 and the cover plate 431 are located at two sides of the electrode assembly 410 along the second direction Y respectively. The bottom plate 423 is perpendicular to the first side plate 421 and the second side plate 422. The bottom plate 423 is approximately a rectangular flat plate. In some examples, the bottom plate 423, the first side plate 421, and the second side plate 422 are integrally formed. In other examples, the bottom plate 423 may be connected to the first side plate 421 and the second side plate 422 by welding or the like instead.

In some embodiments, the dimension of the battery cell 40 along the second direction Y is greater than the dimension of the battery cell 40 along the first direction X and the dimension of the battery cell 40 along the third direction Z. The space reserved for the battery 10 in a vertical direction in the vehicle 1 is limited. Therefore, in order to reduce a height of the battery 10 in the vertical direction, the second direction Y may be made parallel to the horizontal direction, so as to reduce a maximum dimension of the battery 10 in the vertical direction.

In some embodiments, the dimension of the battery cell 40 along the first direction X is greater than the dimension of the battery cell 40 along the third direction Z. Optionally, in the battery 10, the battery cell 40 may be placed sideways. When the battery cell 40 is placed sideways, the first direction X is parallel to the vertical direction.

Figure 7:
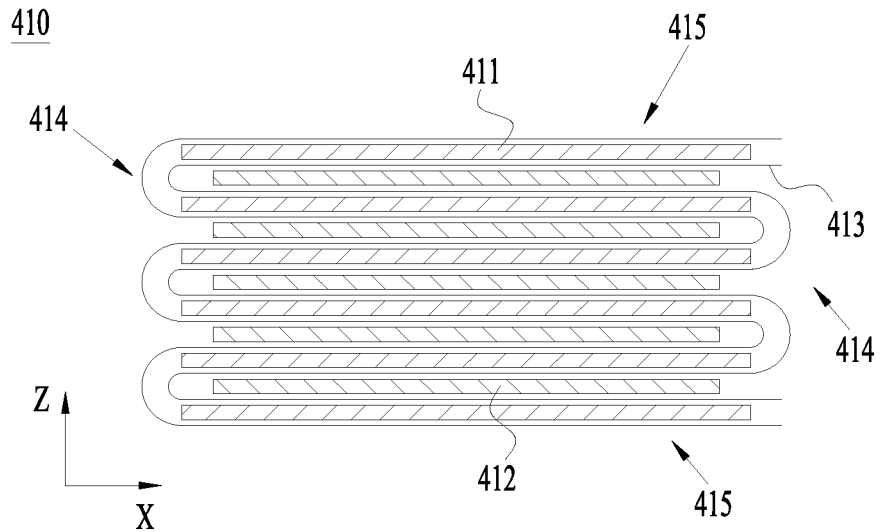
FIG. 7 is a schematic sectional view of an electrode assembly according to an embodiment of this application.
Figure 8:
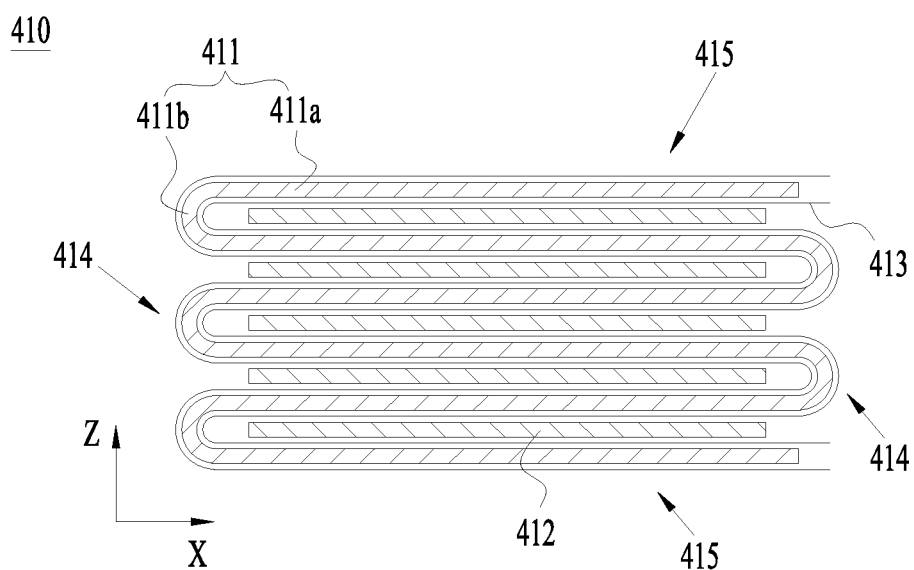
FIG. 8 is a schematic sectional view of an electrode assembly according to another embodiment of this application.
Figure 9:
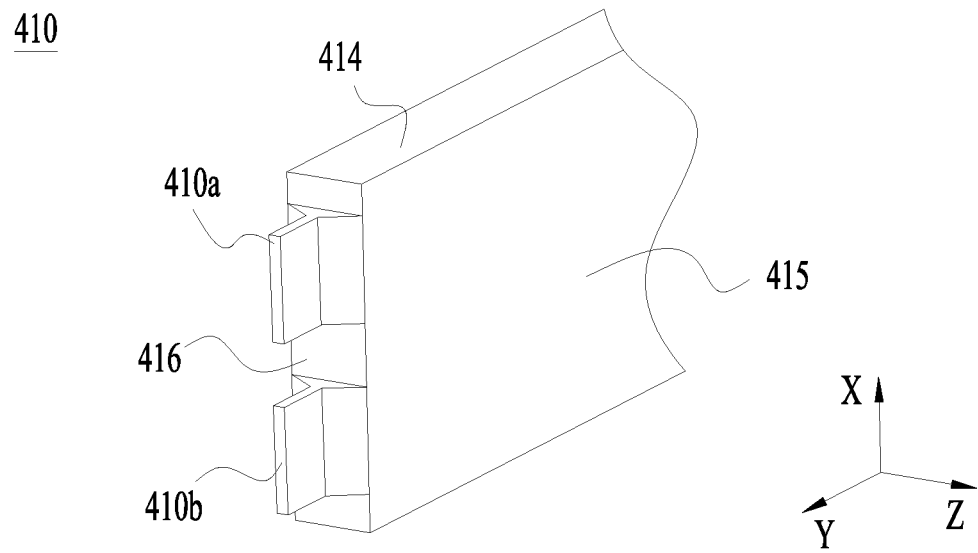
FIG. 9 is a partial schematic structural diagram of an electrode assembly according to an embodiment of this application.

FIG. 7 is a schematic sectional view of an electrode assembly 410 according to an embodiment of this application; FIG. 8 is a schematic sectional view of an electrode assembly 410 according to another embodiment of this application; and FIG. 9 is a partial schematic structural diagram of an electrode assembly 410 according to an embodiment of this application.

The electrode assembly 410 according to embodiments of this application includes at least one first electrode plate 411 and at least one second electrode plate 412. The polarity of the first electrode plate 411 is opposite to the polarity of the second electrode plate 412. For example, when the first electrode plate 411 is a negative electrode plate, the second electrode plate 412 is a positive electrode plate; and, when the first electrode plate 411 is a positive electrode plate, the second electrode plate 412 is a negative electrode plate. The electrode assembly 410 further includes a separator 413. The separator 413 separates the first electrode plate 411 from the second electrode plate 412.

At least a part of the first electrode plate 411 is stacked together with the second electrode plate 412. The stacking direction is parallel to a thickness direction of the second electrode plate 412. The electrode assembly 410 according to embodiments of this application is a stacked structure, and includes a plurality of second electrode plates 412 that are stacked. Each second electrode plate 412 is approximately flat and separated from each other. At least a part of the first electrode plate 411 is disposed between adjacent second electrode plates 412.

In some embodiments, as shown in FIG. 7, the electrode assembly 410 includes a plurality of first electrode plates 411 and a plurality of second electrode plates 412. The plurality of first electrode plates 411 and the plurality of second electrode plates 412 are alternately stacked. The stacking direction of the first electrode plates 411 and the second electrode plates 412 is parallel to the thickness direction of the first electrode plates 411 and the thickness direction of the second electrode plates 412. In some examples, both the first electrode plates 411 and the second electrode plates 412 are rectangular flat plates and are disposed parallel to each other.

In the battery cell 40, the first electrode plates 411 and the second electrode plates 412 are perpendicular to the cover plate 431. In some examples, the stacking direction of the first electrode plates 411 and the second electrode plates 412 is parallel to the third direction Z. That is, the first electrode plates 411 and the second electrode plates 412 are parallel to the first direction X and the second direction Y.

The electrode assembly 410 includes two first surfaces 414 facing each other and two second surfaces 415 facing each other. The first surfaces 414 and the second surfaces 415 are exposed surfaces of the electrode assembly 410. Two ends of each first surface 414 along the third direction Z are connected to the two second surfaces 415 respectively. In some examples, the two first surfaces 414 face each other along the first direction X, and the two second surfaces 415 face each other along the third direction Z.

In some examples, an outermost layer of the electrode assembly 410 is the separator 413. Therefore, the first surfaces 414 and the second surfaces 415 are an exposed surface of the separator 413. Specifically, there are two separators 413. Each separator 413 is bent back and forth into a plurality of layers, and includes a plurality of separation layers and a plurality of bend layers. Each bend layer connects two adjacent separation layers. Each separation layer separates the first electrode plate 411 from the second electrode plate 412 that are adjacent. Two ends of the electrode assembly 410 along the third direction Z are two separation layers. Outer surfaces of the two separation layers are the two second surfaces 415. Each first surface 414 includes exposed surfaces of a plurality of bend layers. Although an outer surface of a bend layer is an arc face, the radius of the bend layer is relatively small, and the first surface 414 may approximate to a plane. That is, the electrode assembly 410 approximates to a cuboid.

In other examples, the separator 413 in the electrode assembly 410 is omissible. To implement insulation, an insulation layer may be formed on the surface of the first electrode plate 411 or the surface of the second electrode plate 412. Optionally, the two ends of the electrode assembly 410 along the third direction Z are the first electrode plate 411. An exposed surface of the first electrode plate 411 is the second surface 415. An end of the first electrode plate 411 along the first direction X exceeds the second electrode plate 412. Ends of a plurality of first electrode plates 411 are stacked together to approximately form the first surface 414.

In other embodiments, as shown in FIG. 8, the electrode assembly 410 includes at least one first electrode plate 411 and a plurality of second electrode plates 412. The first electrode plate 411 includes a plurality of first stack sections 411a that are stacked, and a plurality of bend sections 411b. Each bend section 411b is connected to two adjacent first stack sections 411a. Each second electrode plate 412 is disposed between two adjacent first stack sections 411a. Each first stack section 411a is in the shape of a flat plate, and is approximately parallel to the second electrode plate 412. Each bend section 411b is at least partly bent. In some examples, the first stack sections 411a and the second electrode plates 412 are alternately stacked along the third direction Z. The bend sections 411b are located at a side of the second electrode plate 412 along the first direction X. The electrode assembly 410 approximates to a cuboid.

As shown in FIG. 9, the electrode assembly 410 further includes two third surfaces 416. Each third surface 416 is connected to the first surface 414 and the second surface 415. In some examples, the two third surfaces 416 face each other along the second direction Y. That is, in the battery cell 40, one third surface 416 faces the cover plate 431, and the other third surface 416 faces the bottom plate 423. In the second direction Y, the two ends of the separator 413 exceed the first electrode plate 411 and the second electrode plate 412. Therefore, the two ends of the separator 413 approximately form two surfaces, that is, two third surfaces 416. Optionally, a first tab 410a and a second tab 410b extend from one third surface 416.

Figure 10:
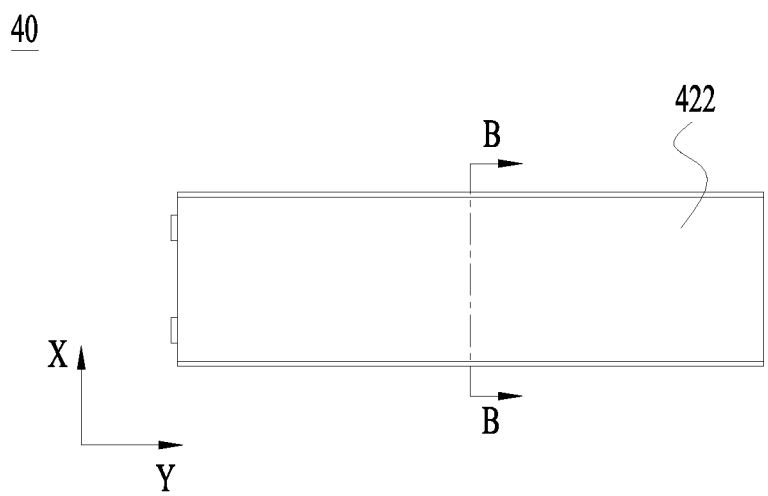
FIG. 10 is a schematic structural diagram of a battery cell according to an embodiment of this application.
Figure 11:
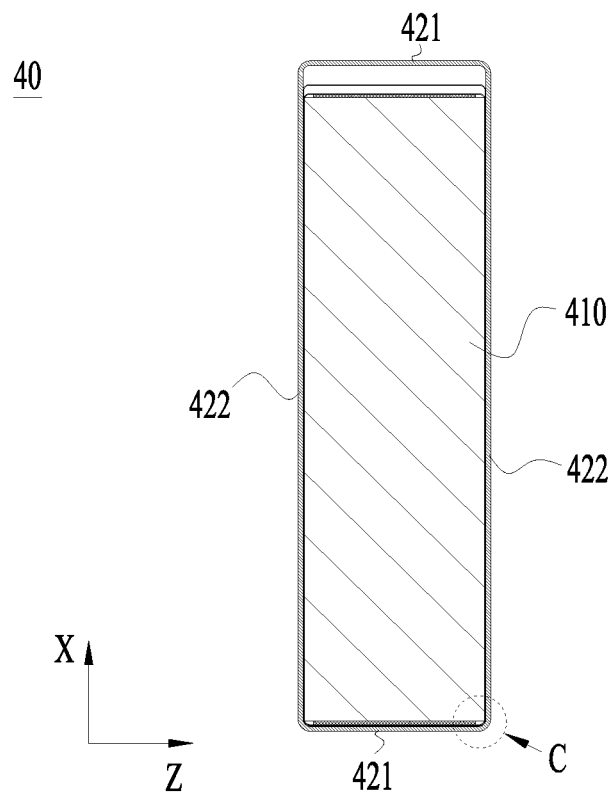
FIG. 11 is schematic sectional view of the battery cell shown in FIG. 10 and sectioned along a B-B line.

FIG. 10 is a schematic structural diagram of a battery cell 40 according to an embodiment of this application; FIG. 11 is schematic sectional view of the battery cell 40 shown in FIG. 10 and sectioned along a B-B line; and FIG. 12 is an enlarged view of a circled position C in the battery cell 40 shown in FIG. 11.

The inventor further finds that when vibrating during use, the electrode assembly shakes in the housing, resulting in a risk that the electrode assembly squeezes the housing. When the electrode assembly squeezes the housing, the active material on the electrode plate is prone to fall off, resulting in a risk of lithium plating. In addition, when the electrode assembly is shaking, the tab is prone to tear up.

Figure 12:
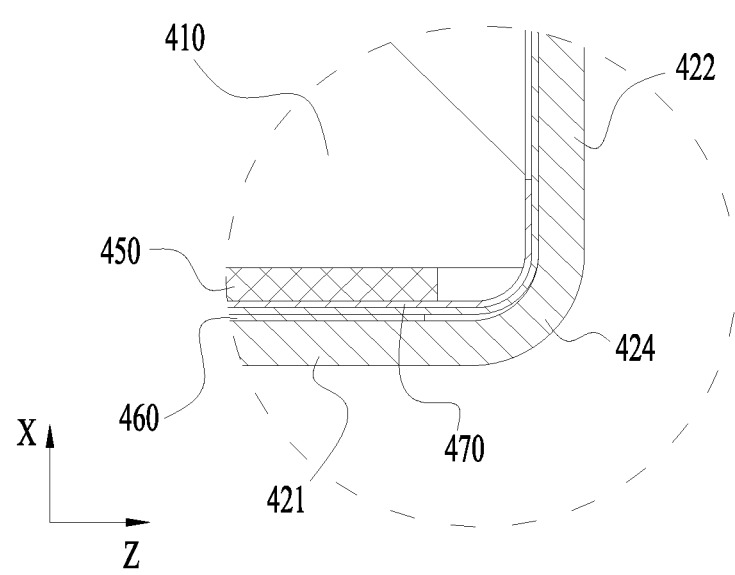
FIG. 12 is an enlarged view of a circled position C in the battery cell shown in FIG. 11.

In view of this, as shown in FIG. 10 to FIG. 12, the battery cell 40 according to this application further includes a support member 450. At least a part of the support member is disposed between the first side plate 421 and the electrode assembly 410. The support member 450 is configured to support the electrode assembly 410 so that a spacing between an end of the first electrode plate 411 and the first side plate 421 in a first direction X is greater than a preset value, the end facing the first side plate 421, and the first direction X being a direction perpendicular to the first side plate 421.

The support member 450 spaces the electrode assembly 410 apart from the first side plate 421 in the first direction X. In some examples, in the first direction X, the support member 450 as a whole is located between the electrode assembly 410 and the first side plate 421. The support member 450 may directly contact the electrode assembly 410 and support the electrode assembly 410, or may indirectly support the electrode assembly 410 through another member. The spacing between the end of the first electrode plate 411 and the first side plate 421 in the first direction X, where the end faces the first side plate 421, is a minimum spacing between the first electrode plate 411 and the first side plate 421 in the first direction X. The preset value varies depending on design requirements. The preset value may need to comprehensively allow for the shape and dimensions of the housing 420 and the shape and dimensions of the electrode assembly 410.

In the battery cell 40 according to this embodiment of this application, the support member 450 can support the electrode assembly 410, reduce a shaking amplitude of the electrode assembly 410 when the battery cell 40 vibrates, reduce an acting force exerted by the first side plate 421 on the electrode assembly 410, and reduce risks of tearing tabs. In addition, with the support member 450 disposed, the spacing between the end of the first electrode plate 411 and the first side plate 421 in the first direction X is greater than a preset value, the end facing the first side plate 421. This reduces the acting force conveyed to the end of the first electrode plate 411, reduces risks of fall-off of the active material of the first electrode plate 411, and suppresses lithium plating.

In some embodiments, by virtue of the support member 450, the spacing between the end of the second electrode plate 412 and the first side plate 421 in the first direction X is made greater than a preset value, the end facing the first side plate 421. Therefore, when the battery cell 40 vibrates, the acting force conveyed to the end of the second electrode plate 412 is reduced, risks of fall-off of the active material of the second electrode plate 412 are reduced, and lithium plating is suppressed.

In some embodiments, a transition plate 424 exists between the first side plate 421 and the second side plate 422. An inner surface of the transition plate 424 is an arc face. The transition plate 424 is a rounded corner formed during formation of the housing 420. With the transition plate 424 disposed, sharp corners of the housing 420 are removed, stress concentration is reduced, and the strength of the housing 420 is increased. An inner surface that is of the first side plate 421 and that faces the electrode assembly 410 is a flat face and is tangent to an inner surface of the transition plate 424. An inner surface that is of the second side plate 422 and that faces the electrode assembly 410 is a flat face and is tangent to the inner surface of the transition plate 424. The transition plate 424 is connected to the end of the first side plate 421 along the third direction Z. The transition plate 424 is four in number. Each transition plate 424 is connected to one first side plate 421 and one second side plate 422.

The inventor further finds that when the battery cell is placed sideways, one first side plate is located at a lower side of the electrode assembly along a vertical direction. The electrode assembly may squeeze the inner surface of the transition plate under the action of gravity. Because the inner surface of the transition plate is an arc face, the inner surface of the transition plate is prone to squeeze the electrode plate under the condition of vibration and impact, thereby causing the active material of the electrode plate to fall off.

In view of this, in some embodiments, the preset value is defined as H, a radius of the inner surface of the transition plate 424 is defined as R, and the preset value H and the radius R satisfy: H≥0.8R. In this case, this application can reduce the area of a region that is of the transition plate 424 and that is prone to squeeze the first electrode plate 411, and can reduce the acting force exerted by the transition plate 424 on the first electrode plate 411, and reduce risks of fall-off of the active material.

The larger the value of H, the smaller the extrusion force exerted by the transition plate 424 on the end of the first electrode plate 411, and the smaller the dimensions of the electrode assembly 410. Comprehensively considering the extrusion force on the first electrode plate 411 and the capacity of the battery cell 40, in some embodiments, the preset value H and the radius R satisfy: R≤H≤2R.

The smaller the value of R, the more prone the transition plate 424 is to stress concentration, and the lower the strength of the housing 420. The larger the value of R, the larger the value of H, the smaller the dimensions of the electrode assembly 410, and the lower the capacity of the battery cell 40. Comprehensively considering the strength of the housing 420 and the capacity of the battery cell 40, in some embodiments, the value of the radius R is 0.5 mm to 2 mm.

The area of the second side plate 422 is larger than the area of the first side plate 421. The first side plate 421 and the second side plate 422 are parallel to the second direction Y. The dimensions of the two side plates in the second direction Y are equal. The dimension of the first side plate 421 along the third direction Z is smaller than the dimension of the second side plate 422 along the first direction X. The second electrode plate 412 is approximately parallel to the second side plate 422. That is, the stacking direction of the plurality of second electrode plates 412 is perpendicular to the second side plate 422.

During charging and discharging, the electrode assembly 410 may expand. Specifically, the expansion of the first electrode plate 411 and the second electrode plate 412 is the largest in the thickness direction of the electrode plate, resulting in the largest expansion amount of the electrode assembly 410 in the third direction Z. The expanded electrode assembly 410 is pressed tightly against the second side plate 422. Therefore, in the third direction Z, the electrode assembly 410 is not prone to shake. In addition, the second surface 415 of the electrode assembly 410 is approximately a flat face. When the electrode assembly 410 squeezes the second side plate 422, the force-bearing area of the electrode assembly 410 is relatively large, and a reacting force received is relatively even. Therefore, the active material of the electrode plate is not prone to fall off when the acting force is received from the second side plate 422.

A support member 450 is disposed between the electrode assembly 410 and each first side plate 421. Specifically, in some examples, there are two support members 450. One support member 450 is located between the electrode assembly 410 and one first side plate 421, and the other support member 450 is located between the electrode assembly 410 and the other first side plate 421. Each support member 450 can reduce the acting force exerted by the corresponding first side plate 421 on the electrode assembly 410 when the battery cell 40 vibrates, and reduce risks of fall-off of the active material.

In a battery 10 in which the battery cell 40 is placed sideways, both first side plates 421 of the battery cell 40 may be placed downward. No matter which first side plate 421 of the battery cell 40 is placed downward, the support member 450 is capable of supporting the electrode assembly 410 from the lower side.

Figure 13:
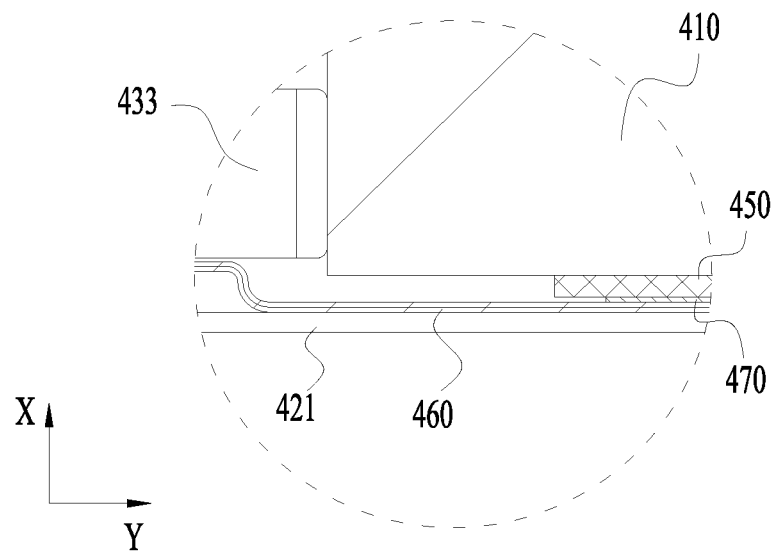
FIG. 13 is an enlarged schematic view of a circled position D in the battery cell shown in FIG. 6.

FIG. 13 is an enlarged schematic view of a circled position D in the battery cell 40 shown in FIG. 6. As shown in FIG. 13, in some embodiments, a surface that is of the first insulating member 433 and that faces the electrode assembly 410 fits snugly with a third surface 416 of the electrode assembly 410, so as to limit the shaking of the electrode assembly 410 in the second direction Y.

In some embodiments, the support member 450 is spaced apart from the first insulating member 433 along the second direction Y. In the second direction Y, the support member 450 is spaced apart from the first insulating member 433 by a preset distance to avoid interference with each other. In a case that the battery cell 40 is placed sideways, the support member 450 may move downward under the action of the electrode assembly 410. The first insulating member 433 will not interfere with the support member 450 during the movement.

Figure 14:
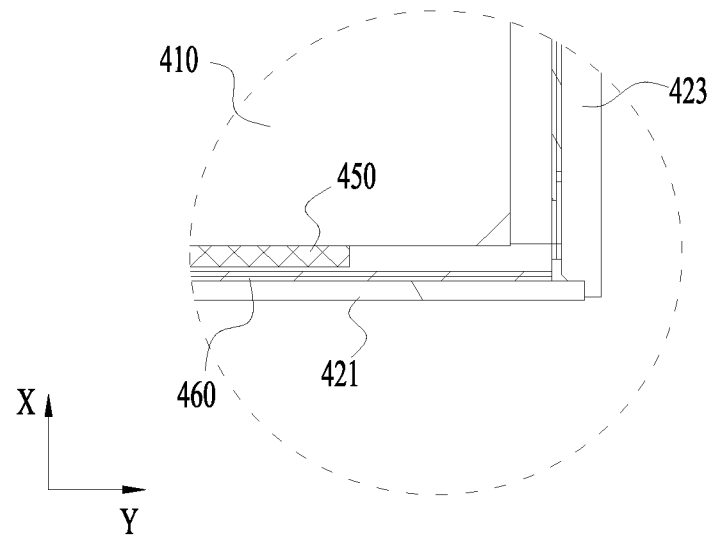
FIG. 14 is an enlarged schematic view of a circled position E in the battery cell shown in FIG. 6.

FIG. 14 is an enlarged schematic view of a circled position E in the battery cell 40 shown in FIG. 6. As shown in FIG. 14, in some embodiments, the support member 450 is spaced apart from the bottom plate 423 along the second direction Y. In the second direction Y, the support member 450 is spaced apart from the bottom plate 423 by a preset distance to avoid interference with each other.

Figure 15:
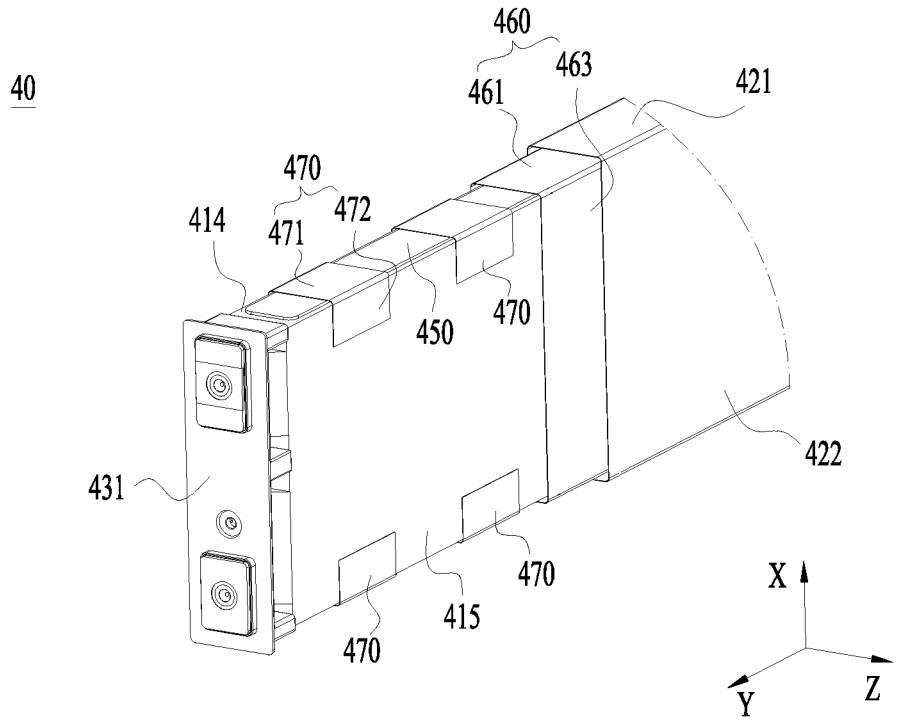
FIG. 15 is a schematic exploded view of a battery cell according to an embodiment of this application.

FIG. 15 is a schematic exploded view of a battery cell 40 according to an embodiment of this application. As shown in FIG. 15, in some embodiments, the support member 450 is located between the first surface 414 and the first side plate 421. Optionally, the support member 450 is in the shape of a flat plate, and is parallel to the first side plate 421. The flat-plate-shaped support member 450 leads to more even distribution of the acting force between the electrode assembly 410 and the support member 450.

In some embodiments, the two edges of the first surface 414 along the second direction Y exceed the two edges of the support member 450 along the second direction Y respectively. The dimension of the first surface 414 along the second direction Y is larger than the dimension of the support member 450 along the second direction Y. In this way, in the second direction Y, an edge that is of the support member 450 and that is close to the first insulating member 433 is spaced apart from the first insulating member 433 by a given distance. An edge that is of the support member 450 and that is close to the bottom plate 423 is spaced apart from the bottom plate 423 by a given distance.

To fully utilize the inner space of the housing 420 and ensure a relatively high capacity of the electrode assembly 410, the dimension of the first surface 414 along the third direction Z is generally larger than the dimension of the first side plate 421 along the third direction Z. To prevent the transition plate 424 from interfering with the support member 450, the dimension of the support member 450 along the third direction Z is generally less than or equal to the dimension of the first side plate 421 along the third direction Z. In other words, the dimension of the first surface 414 along the third direction Z is larger than the dimension of the support member 450 along the third direction Z. In some embodiments, the two edges of the first surface 414 along the third direction Z exceed the two edges of the support member 450 along the third direction Z respectively.

In some embodiments, the battery cell 40 further includes a second insulating member 460 configured to isolate the electrode assembly 410 from the housing 420. The second insulating member 460 can reduce risks of electrical conduction between the electrode assembly 410 and the housing 420. The second insulating member 460 may be made of polypropylene.

Specifically, in some examples, the second insulating member 460 includes a first insulating portion 461. The first insulating portion 461 is disposed between the first side plate 421 and the first surface 414. The first insulating portion 461 not only dielectrically isolates the first side plate 421 from the electrode assembly 410, but also fits with the support member 450 to support the electrode assembly 410. The position of the first insulating portion 461 may be set as required. In some examples, the first insulating portion 461 may be located between the first surface 414 and the support member 450. In other examples, the first insulating portion 461 may be located between the support member 450 and the first side plate 421 instead. The second insulating member 460 coats the electrode assembly 410 from outside, and may include other parts. The specific structure of the second insulating member 460 will be described in detail later.

In some embodiments, the battery cell 40 further includes a bonding member 470. The bonding member 470 is configured to connect the support member 450 to the electrode assembly 410. The bonding member 470 fixes the support member 450 to the electrode assembly 410. In this way, when the battery cell 40 vibrates, relative movement between the support member 450 and the electrode assembly 410 is reduced or avoided, and the risks of the support member 450 deviating from the preset position in the housing 420 are reduced. In addition, in a process of placing the electrode assembly 410 into the housing 420, the support member 450 can enter the housing 420 along with the electrode assembly 410, thereby simplifying the assembling process of the battery cell 40. In some examples, the bonding member 470 is adhesive tape. In other examples, the surface of the support member 450 may be coated with glue instead, and then the support member 450 is bonded to the first surface 414. After being cured, the glue forms the bonding member 470.

In some embodiments, the second surface 415 is connected to the first surface 414, and is perpendicular to the first side plate 421 and the cover plate 431. The bonding member 470 includes a first bonding portion 471 and a second bonding portion 472. The first bonding portion 471 is bonded to a surface that is of the support member 450 and that is away from the first surface 414. The second bonding portion 472 is connected to the first bonding portion 471 and bonded to the second surface 415. The first bonding portion 471 further serves to support the electrode assembly 410.

A joint between the first surface 414 and the second surface 415 is most prone to receive the acting force of the transition plate 424. Therefore, the electrode plate close to the joint is more prone to fall-off of the active material. The bonding member 470 can coat at least a part of the joint from outside, and space the joint apart from the transition plate 424, thereby reducing the acting force on the electrode plate and reducing risks of fall-off of the active material.

In some embodiments, the second bonding portion 472 of the bonding member 470 is two in number. The two second bonding portions are connected to two ends of the first bonding portion 471 along the third direction Z respectively. The two second bonding portions 472 are bonded to the two second surfaces 415 respectively. The bonding member 470 is bent in a U shape.

In some embodiments, the bonding member 470 is plural in number, and the plurality of bonding members 470 are discrete and spaced out along the second direction Y. The support member 450 is relatively large in dimension in the second direction Y. The plurality of bonding members 470 can increase strength of connection between the support member 450 and the electrode assembly 410. A gap between the bonding members 470 may be configured to accommodate an electrolytic solution.

In some embodiments, the support member 450 is disposed between the first insulating portion 461 and the first surface 414. During assembling of the battery cell 40, the support member 450 may be fixed onto the electrode assembly 410 through the bonding member 470 first, and then the electrode assembly 410 and the support member 450 are externally coated with the second insulating member 460. In a process of placing the electrode assembly 410 into the housing 420, the second insulating member 460 can protect the support member 450 and guide the support member 450 into the housing, thereby preventing the support member 450 from being scratched by the housing 420.

Figure 16:
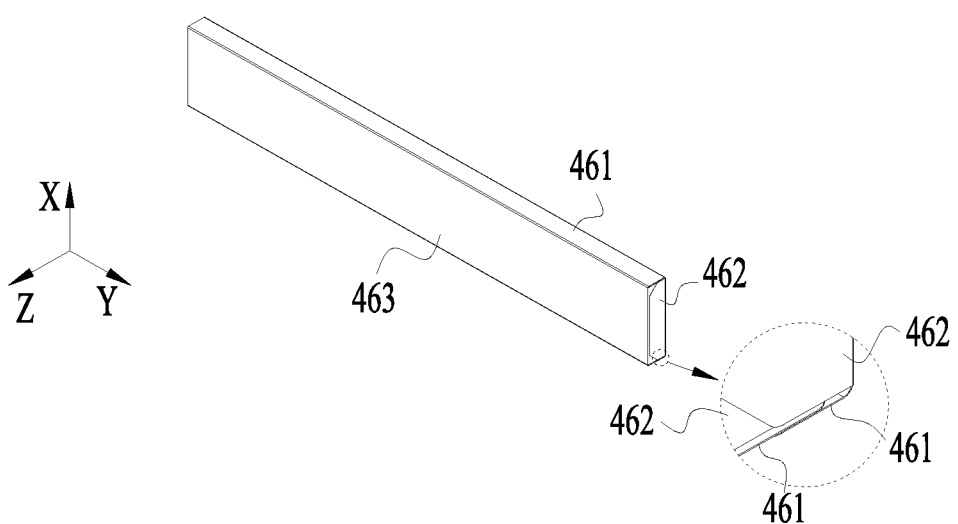
FIG. 16 is a schematic structural diagram of a second insulating member of a battery cell according to an embodiment of this application.
Figure 17:
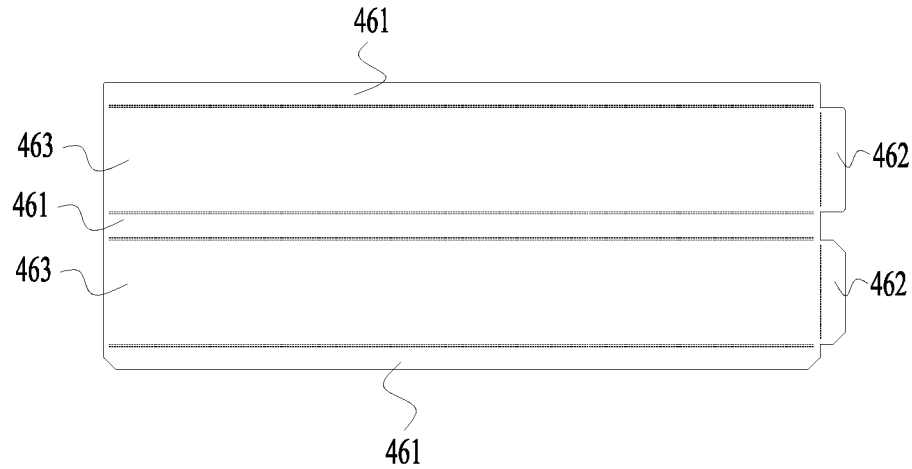
FIG. 17 is a schematic diagram of a second insulating member of a battery cell in an unfolded state according to an embodiment of this application.

FIG. 16 is a schematic structural diagram of a second insulating member 460 of a battery cell 40 according to an embodiment of this application; and FIG. 17 is a schematic diagram of a second insulating member 460 of a battery cell 40 in an unfolded state according to an embodiment of this application.

As shown in FIG. 16 and FIG. 17, in some embodiments, the second insulating member 460 further includes a second insulating portion 462 and two third insulating portions 463. The second insulating portion 462 is located at a side that is of the electrode assembly 410 and that faces away from the cover plate 431 along the second direction Y, and is connected to the third insulating portions 463. The two third insulating portions 463 are disposed at two sides of the electrode assembly 410 along the third direction Z respectively. The second insulating portion 462 is located between the electrode assembly 410 and the bottom plate 423 to isolate the electrode assembly 410 from the bottom plate 423. One third insulating portion 463 is located between one second surface 415 and one second side plate 422. The other third insulating portion 463 is located between the other second surface 415 and the other second side plate 422. The two third insulating portions 463 isolate the two second side plates 422 from the electrode assembly 410. Each third insulating portion 463 is in the shape of a flat plate, and is parallel to the second side plate 422. The second insulating portion 462 extends from the end of the third insulating portion 463 along the second direction Y, and is bent against the third insulating portion 463.

First insulating portion 461 connected to the third insulating portions 463 are disposed at two sides of the electrode assembly 410 along the first direction X. Specifically, at least one first insulating portion 461 is disposed between one first side plate 421 and one first surface 414, and at least one first insulating portion 461 is disposed between the other first side plate 421 and the other first surface 414. In some embodiments, at least one first insulating portion 461 is connected to the two third insulating portions 463.

In some embodiments, the second insulating portion 462 is two in number. The two second insulating portions are connected to the two third insulating portions 463 respectively, and the two second insulating portions 462 at least partly overlap in the second direction Y. In some examples, the bottom plate 423 is welded to the first side plate 421 and the second side plate 422 to form weld marks. The two second insulating portions 462 that are stacked can separate the electrode assembly 410 from the weld marks, thereby reducing risks of piercing the separator 413 by the weld marks. In some examples, the two second insulating portions 462 are fusion-spliced together.

In some embodiments, two first insulating portions 461 are disposed at a side of the electrode assembly 410 along the first direction X. The two first insulating portions 461 are connected to the two third insulating portions 463 respectively and at least partly overlap in the first direction X. The two first insulating portions 461 are located between one first surface 414 and one first side plate 421, and can support the electrode assembly 410 in the first direction X. In some examples, the two first insulating portions 461 are fusion-spliced together.

The second insulating member 460 may be formed by bending a flat plate-shaped insulating strip. The insulating strip is provided with a through-hole at a joint between the first insulating portion 461 and the third insulating portion 463, and is provided with a through-hole at a joint between the second insulating portion 462 and the third insulating portion 463. With the through-holes being available, the bending of the insulating strip can be guided. In addition, an electrolytic solution can pass through the through-holes, thereby improving effects of infiltrating the electrode assembly 410. After being formed by bending, the first insulating portion 461 and the third insulating portion 463 surround the first insulating member 433, and are fixed to the first insulating member 433 by fusion-splicing.

Figure 18:
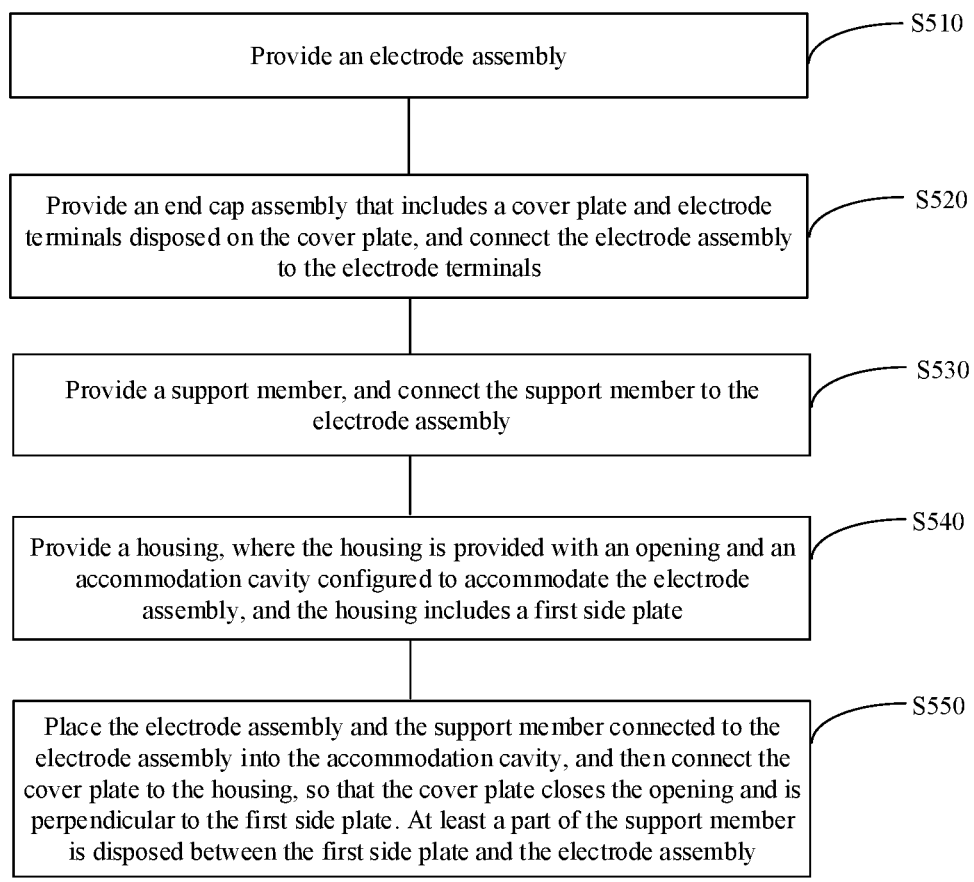
FIG. 18 is a schematic flowchart of a method for manufacturing a battery cell according to an embodiment of this application.

FIG. 18 is a schematic flowchart of a method for manufacturing a battery cell according to an embodiment of this application. As shown in FIG. 18, the manufacturing method includes the following steps:

S510: Provide an electrode assembly, where the electrode assembly includes at least one first electrode plate and at least one second electrode plate, and at least a part of the first electrode plate is stacked together with the second electrode plate;

S520: Provide an end cap assembly that includes a cover plate and electrode terminals disposed at the cover plate, and connect the electrode assembly to the electrode terminals;

S530: Provide a support member, and connect the support member to the electrode assembly;

S540: Provide a housing, where the housing is provided with an opening and an accommodation cavity configured to accommodate the electrode assembly, and the housing includes a first side plate; and S550: Place the electrode assembly and the support member connected to the electrode assembly into the accommodation cavity, and then connect the cover plate to the housing, so that the cover plate closes the opening and is perpendicular to the first side plate. At least a part of the support member is disposed between the first side plate and the electrode assembly. The support member is configured to support the electrode assembly so that a spacing between an end of the first electrode plate and the first side plate in a first direction is greater than a preset value, the end facing the first side plate, and the first direction being a direction perpendicular to the first side plate.

For the related structures of the battery cells manufactured according to the manufacturing method of this embodiment, refer to the related content of the battery cells described in the foregoing embodiments corresponding to FIG. 1 to FIG. 17, details of which are omitted here.

Figure 19:
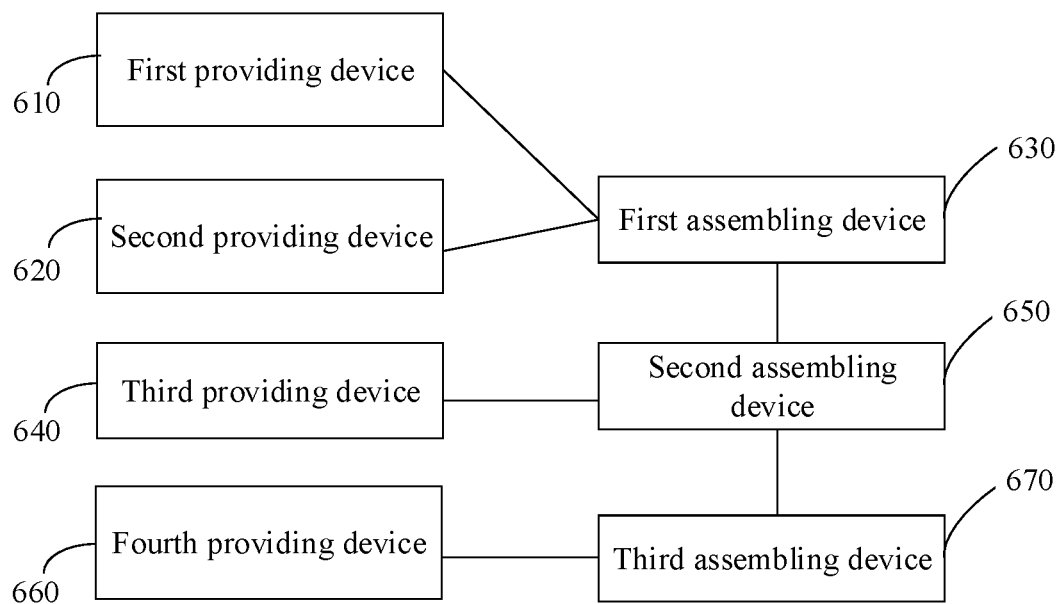
FIG. 19 is a schematic block diagram of a system for manufacturing a battery cell according to an embodiment of this application.

FIG. 19 is a schematic block diagram of a system for manufacturing a battery cell according to an embodiment of this application. As shown in FIG. 19, the manufacturing system 600 includes a first providing device 610, a second providing device 620, a first assembling device 630, a third providing device 640, a second assembling device 650, a fourth providing device 660, and a third assembling device 670. The first providing device 610 is configured to provide an electrode assembly, where the electrode assembly includes at least one first electrode plate and at least one second electrode plate, and at least a part of the first electrode plate is stacked together with the second electrode plate. The second providing device 620 is configured to provide an end cap assembly that includes a cover plate and electrode terminals disposed at the cover plate. The first assembling device 630 is configured to connect the electrode assembly to the electrode terminals. The third providing device 640 is configured to provide a support member. The second assembling device 650 is configured to connect the support member to the electrode assembly. The fourth providing device 660 is configured to provide a housing, where the housing is provided with an opening and an accommodation cavity configured to accommodate the electrode assembly, and the housing includes a first side plate. The third assembling device 670 is configured to place the electrode assembly and the support member connected to the electrode assembly into the accommodation cavity, and then connect the cover plate to the housing, so that the cover plate closes the opening and is perpendicular to the first side plate. At least a part of the support member is disposed between the first side plate and the electrode assembly. The support member is configured to support the electrode assembly so that a spacing between an end of the first electrode plate and the first side plate in a first direction is greater than a preset value, the end facing the first side plate, and the first direction being a direction perpendicular to the first side plate.

For the related structures of the battery cells manufactured by using the manufacturing system of this embodiment, refer to the related content of the battery cells described in the foregoing embodiments corresponding to FIG. 1 to FIG. 17, details of which are omitted here.

Finally, it needs to be noted that the foregoing embodiments are merely intended to describe the technical solutions of this application, but not to limit this application. Although this application is described in detail with reference to the foregoing embodiments, a person of ordinary skill in the art understands that modifications may still be made to the technical solutions described in the foregoing embodiments or equivalent replacements may still be made to some technical features thereof, without making the essence of the corresponding technical solutions depart from the spirit and scope of the technical solutions of the embodiments of this application.

What is claimed is:

1. A battery cell comprising:
an electrode assembly including a first electrode plate and a second electrode plate, at least a part of the first electrode plate being stacked with the second electrode plate;
a housing provided with an opening and an accommodation cavity configured to accommodate the electrode assembly, the housing including a side plate, and the electrode assembly including a surface facing the side plate;
a cover plate perpendicular to the side plate and configured to close the opening;
a support member, at least a part of the support member being disposed between the side plate and the electrode assembly, and the support member being configured to support the electrode assembly so that a spacing between an end of the first electrode plate and the side plate in a first direction is greater than a preset value, the end facing the side plate, and the first direction being a direction perpendicular to the side plate;
a bonding member configured to connect the support member to the electrode assembly; and
an insulating member configured to isolate the electrode assembly from the housing;
wherein in a direction from the electrode assembly to the housing, the surface, the support member, the bonding member, the insulating member, and the side plate are sequentially arranged in this order.

2. The battery cell according to claim 1, wherein:
the side plate is a first side plate;
the housing further includes a second side plate perpendicular to the first side plate and the cover plate, a transition plate is provided between the first side plate and the second side plate, and an inner surface of the transition plate is an arc face; and
the preset value and a radius of the inner surface of the transition plate satisfy: H≥0.8R, where H denotes the preset value and R denotes the radius of the inner surface of the transition plate.

3. The battery cell according to claim 2, wherein the preset value H and the radius R satisfy: R≤H≤2R.

4. The battery cell according to claim 2, wherein the radius is 0.5 mm to 2 mm.

5. The battery cell according to claim 2, wherein an area of the second side plate is larger than an area of the first side plate.

6. The battery cell according to claim 1,
wherein the insulating member is a second insulating member;
the battery cell further comprising:
a first insulating member disposed at a side of the cover plate, the side facing the electrode assembly, and the first insulating member being configured to isolate the cover plate from the electrode assembly; and
the support member is spaced apart from the first insulating member along a second direction, the second direction being a direction perpendicular to the cover plate.

7. The battery cell according to claim 1, wherein:
the housing further includes a bottom plate disposed at a side the electrode assembly, the side facing away from the cover plate, and the bottom plate being perpendicular to the side plate; and
the support member is spaced apart from the bottom plate along a second direction, the second direction being a direction perpendicular to the cover plate.

8. The battery cell according to claim 1, wherein:
the side plate is one of two side plates of the housing, the two side plates are located at two sides of the electrode assembly along the first direction, respectively; and
the support member is one of two support members each disposed between the electrode assembly and a corresponding one of the two side plates.

9. The battery cell according to claim 1, wherein the support member is located between the surface and the side plate.

10. The battery cell according to claim 9, wherein two edges of the surface along a second direction exceed two edges of the support member along the second direction, respectively, two edges of the surface along a third direction exceed two edges of the support member along the third direction, respectively, the second direction is a direction perpendicular to the cover plate, and the third direction is perpendicular to the first direction and the second direction.

11. The battery cell according to claim 9, wherein:
the insulating member includes an insulating portion disposed between the side plate and the surface.

12. The battery cell according to claim 11, wherein:
the insulating portion is one of two first insulating portions disposed at two sides of the electrode assembly along the first direction;
the insulating member further includes a second insulating portion and two third insulating portions, the second insulating portion is located at a side of the electrode assembly and is connected to the third insulating portions, the side of the electrode assembly faces away from the cover plate along a second direction perpendicular to the cover plate, and the two third insulating portions are disposed at two sides, respectively, of the electrode assembly along a third direction perpendicular to the first direction and the second direction; and
each of the first insulating portions is connected to one of the third insulating portions, and at least one of the first insulating portions is connected to both of the two third insulating portions.

13. The battery cell according to claim 12, wherein:
the second insulating portion is one of two second insulating portions of the insulating member, the two second insulating portions are connected to the two third insulating portions, respectively, and the two second insulating portions at least partly overlap in the second direction; and
the two first insulating portions are two of three first insulating portions of the insulating member, one of the three first insulating portions is disposed at one of the two sides of the electrode assembly along the first direction and is connected to both of the two third insulating portions, and other two of the three first insulating portions are disposed at another one of the two sides of the electrode assembly along the first direction, are connected to the two third insulating portions, respectively, and at least partly overlap in the first direction.

14. The battery cell according to claim 11, wherein the support member is disposed between the insulating portion and the surface.

15. The battery cell according to claim 1, wherein:
the surface is a first surface of the electrode assembly;
the electrode assembly further includes a second surface connected to the first surface, and the second surface is perpendicular to the side plate and the cover plate; and
the bonding member includes a first bonding portion and a second bonding portion, the first bonding portion is bonded to a surface of the support member, the surface of the support member is away from the first surface, and the second bonding portion is connected to the first bonding portion and bonded to the second surface.

16. The battery cell according to claim 1, wherein the bonding member is one of a plurality of bonding member of the battery cell, and the plurality of bonding members are discrete and arranged at intervals along a second direction, the second direction being a direction perpendicular to the cover plate.

17. A battery comprising:
a box; and
the battery cell according to claim 1 accommodated in the box.

18. The battery according to claim 17, wherein in the battery cell, the side plate is located at a lower side of the electrode assembly along a vertical direction.

19. An electrical device comprising the battery according to claim 17 configured to provide electrical energy.

* * * * *